United States Patent
Kumar et al.

(10) Patent No.: US 10,664,429 B2
(45) Date of Patent: May 26, 2020

(54) SYSTEMS AND METHODS FOR MANAGING SERIAL ATTACHED SMALL COMPUTER SYSTEM INTERFACE (SAS) TRAFFIC WITH STORAGE MONITORING

(71) Applicant: Dell Products, L.P., Round Rock, TX (US)

(72) Inventors: Pavan Kumar, Bangalore (IN); Lucky Pratap Khemani, Bangalore (IN); Manjunath Vishwanath, Bangalore (IN); John R. Sieber, Leander, TX (US); Robert G. Bassman, The Hills, TX (US); Babu Krishna Chandrasekhar, Round Rock, TX (US)

(73) Assignee: Dell Products, L.P., Round Rock, TX (US)

(*) Notice: Subject to any disclaimer, the term of this patent is extended or adjusted under 35 U.S.C. 154(b) by 138 days.

(21) Appl. No.: 15/852,844

(22) Filed: Dec. 22, 2017

(65) Prior Publication Data
US 2019/0197003 A1 Jun. 27, 2019

(51) Int. Cl.
| | | |
|---|---|---|
| G06F 11/00 | (2006.01) | |
| G06F 13/40 | (2006.01) | |
| G06F 13/37 | (2006.01) | |
| G06F 13/42 | (2006.01) | |
| G06F 3/06 | (2006.01) | |
| G06F 11/20 | (2006.01) | |

(52) U.S. Cl.
CPC ........ *G06F 13/4068* (2013.01); *G06F 3/0619* (2013.01); *G06F 3/0653* (2013.01); *G06F 3/0689* (2013.01); *G06F 11/2005* (2013.01); *G06F 13/37* (2013.01); *G06F 13/4282* (2013.01); *G06F 2201/805* (2013.01); *G06F 2213/0026* (2013.01); *G06F 2213/0028* (2013.01)

(58) Field of Classification Search
CPC ............. G06F 11/2023; G06F 11/2028; G06F 11/2033; G06F 11/2041; G06F 11/2092
See application file for complete search history.

(56) References Cited

U.S. PATENT DOCUMENTS

| | | | |
|---|---|---|---|
| 9,734,093 B2* | 8/2017 | Khemani | G06F 12/1408 |
| 9,804,937 B2* | 10/2017 | Huang | G06F 11/2025 |
| 10,013,319 B2* | 7/2018 | Moskowiz | G06F 3/0619 |
| 10,069,718 B2* | 9/2018 | Khemani | H04L 41/0663 |
| 2006/0224708 A1* | 10/2006 | Hawkins | G06F 9/4411 |
| | | | 709/222 |
| 2008/0155300 A1* | 6/2008 | Yang | G06F 8/65 |
| | | | 714/1 |

(Continued)

*Primary Examiner* — Elmira Mehrmanesh
(74) *Attorney, Agent, or Firm* — Fogarty LLP (57) ABSTRACT

Systems and methods for managing Serial Attached Small Computer System Interface (SAS) traffic with storage monitoring are described. In some embodiments, an Information Handling System (IHS) may include an embedded controller (EC) and a memory coupled to the EC, the memory having program instructions stored thereon that, upon execution, cause the EC to: designate a first Baseband Management Controller (BMC) as active; designate a second BMC as passive; and receive, from the active BMC, monitoring data relating to one or more of a plurality of storage devices without receiving the monitoring data from the passive BMC.

20 Claims, 4 Drawing Sheets (56) References Cited

U.S. PATENT DOCUMENTS

| | | | |
|---|---|---|---|
| 2009/0271655 A1* | 10/2009 | Hotta | G06F 11/2025 714/4.1 |
| 2010/0180161 A1* | 7/2010 | Kern | G06F 11/2028 714/47.2 |
| 2015/0067084 A1* | 3/2015 | Yeh | G06F 11/2007 709/209 |
| 2015/0253029 A1* | 9/2015 | Palmer | F24F 11/30 700/276 |
| 2016/0099886 A1* | 4/2016 | Rao | G06F 9/5061 709/226 |
| 2017/0102952 A1* | 4/2017 | Khemani | G06F 13/4282 |
| 2017/0139797 A1* | 5/2017 | Wang | G06F 11/3027 |

* cited by examiner

SYSTEMS AND METHODS FOR MANAGING SERIAL ATTACHED SMALL COMPUTER SYSTEM INTERFACE (SAS) TRAFFIC WITH STORAGE MONITORING

FIELD

This disclosure relates generally to Information Handling Systems (IHSs), and more specifically, to systems and methods for managing Serial Attached Small Computer System Interface (SAS) traffic with storage monitoring.

BACKGROUND

As the value and use of information continues to increase, individuals and businesses seek additional ways to process and store information. One option is an information handling system (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated.

Variations in IHSs allow for IHSs to be general or configured for a specific user or specific use such as financial transaction processing, airline reservations, enterprise data storage, global communications, etc. IHSs may include a variety of hardware and software components that may be configured to process, store, and communicate information and may include one or more computer systems, data storage systems, and networking systems.

SUMMARY

Embodiments of systems and methods for managing Serial Attached Small Computer System Interface (SAS) traffic with storage monitoring are described herein. In an illustrative, non-limiting embodiment, an Information Handling System (IHS) may include an embedded controller (EC) and a memory coupled to the EC, the memory having program instructions stored thereon that, upon execution, cause the EC to: designate a first Baseband Management Controller (BMC) as active; designate a second BMC as passive; and receive, from the active BMC, monitoring data relating to one or more of a plurality of storage devices without receiving the monitoring data from the passive BMC.

In some cases, each of the first and second BMCs is a distinct compute sled of a common chassis, and the plurality of storage devices are part of storage sled in the common chassis. Each compute sled is coupled to the storage sled via a host bus adapter (HBA) in communication with a Serial Attached Small Computer System Interface (SAS) expander. To designate the active BMC, the program instructions, upon execution, further cause the EC to select the first BMC over the second BMC for the active designation using a round-robin method. Additionally or alternatively, the EC may select the first BMC over the second BMC based upon a comparison between performance indicators of first and second BMCs.

In some implementations, the storage devices of the storage sled are grouped into zones, the first BMC is configured to access a first zone comprising a first storage device and excluding a second storage device, and the second BMC is configured to access the second zone comprising a second storage device and excluding first storage device. The first BMC may be concurrently designated as active with respect to the first zone and as passive with respect to the second zone, the second BMC may be concurrently designated as active with respect to the second zone and as passive with respect to the first zone, wherein the designations may be used simultaneously.

The program instructions upon execution, may cause the EC to designate the second BMC as active upon failure or loss of performance of the first BMC. Additionally or alternatively, the EC may designate a third BMC as failover, and it may then designate the failover BMC as active upon failure or loss of performance of the first BMC.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity, and have not necessarily been drawn to scale.

DETAILED DESCRIPTION

Systems and methods for managing Serial Attached Small Computer System Interface (SAS) traffic with storage monitoring are described. In some embodiments, a chassis hosting a plurality of Information Handling Systems (IHSs) may comprise a plurality of compute blades (also referred to as nodes or sleds), storage blades, network blades, and/or a Chassis Management Module.

Each compute blade may comprise a storage controller, such as, for example, a Baseband Management Controller (BMC), a SAS storage Peripheral Component Interconnect PCI-e mezzanine card, as well as a Host Bus Adapter (HBA). In some cases, each compute blade may be configured to connect to and/or monitor a storage blade over a dual SAS Input/Output Module (IOM), and each storage blade may be connected to both SAS IOMs to provide a redundant path and/or other features.

When a chassis hosts multiple compute and/or storage blades, the HBA on each blade ordinarily enumerates and monitors every storage device connected to the IOM. A conventional storage monitoring approach is to have every HBA on every compute blade monitoring all the of storage devices (e.g., "just-a-bunch-of-disks" or "JBODs") in the chassis, independently of any other monitoring that may be concurrently performed by other HBAs of other compute blades (e.g., Enclosure Management Modules or "EMMs," fans, temperature probes, Power Supply Units (PSUs), and drive thermal monitoring).

As such, the inventors hereof have determined that the conventional approach results in increased and/or redundant SAS traffic through the SAS IOM/buses in the chassis, and thus has a negative impact in I/O performance. In some cases, individual storage devices in the storage blade may be zoned in a such a way that the same drive can be shared among multiple HBAs. And, particularly in these situations, thermal polling of drives shared by multiple HBAs only compound SAS traffic problems in the chassis.

In contrast, systems and methods described herein may reduce an otherwise exponential increase in redundant traffic in the SAS subsystem that would result with an increase in the number of compute blades and HBAs in the chassis.

For instance, in a chassis with 2 compute blades and 5 storage blades, as many as 80 drives or more (e.g., 16 drives on each storage blade) may be shared between both compute blades. Under the aforementioned conventional approach, the BMC of each compute node may poll all 80 drives once every 10 seconds (or another configurable time period), for example. With both BMCs polling, there would be 160 commands issued every 10 seconds. Using the systems and methods described herein, however, SAS traffic in this example may be reduced by as much as 50% or more. It should be noted that the percentage of traffic reduction becomes even greater the larger the number of compute nodes in the chassis.

In various embodiments, systems and methods described herein may be integrated with any suitable server cluster architecture, such as like software-defined storage (SDS) or virtual storage area networks (VSANs). These systems and methods may increase SAS I/O performance relatively 1:N (where N is number of compute nodes), such that instead N blades performing redundant storage monitoring, only a single active compute sled will perform the storage monitoring and relay the data to the chassis. Furthermore, a decrease in redundant SAS traffic in the storage subsystem can directly improve cooling performance in the chassis.

The chassis may periodically check storage health monitoring of BMCs, and proactively designate the potential candidate to facilitate a smooth switchover to another BMC upon failure of performance degradation of the storage monitoring process.

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources such as a Central Processing Unit (CPU) or hardware or software control logic, Read-Only Memory (ROM), and/or other types of nonvolatile memory.

Additional components of an IHS may include one or more disk drives, one or more network ports for communicating with external devices as well as various I/O devices, such as a keyboard, a mouse, touchscreen, and/or a video display. An IHS may also include one or more buses operable to transmit communications between the various hardware components. An example of an IHS is described in more detail below.

Figure 1:
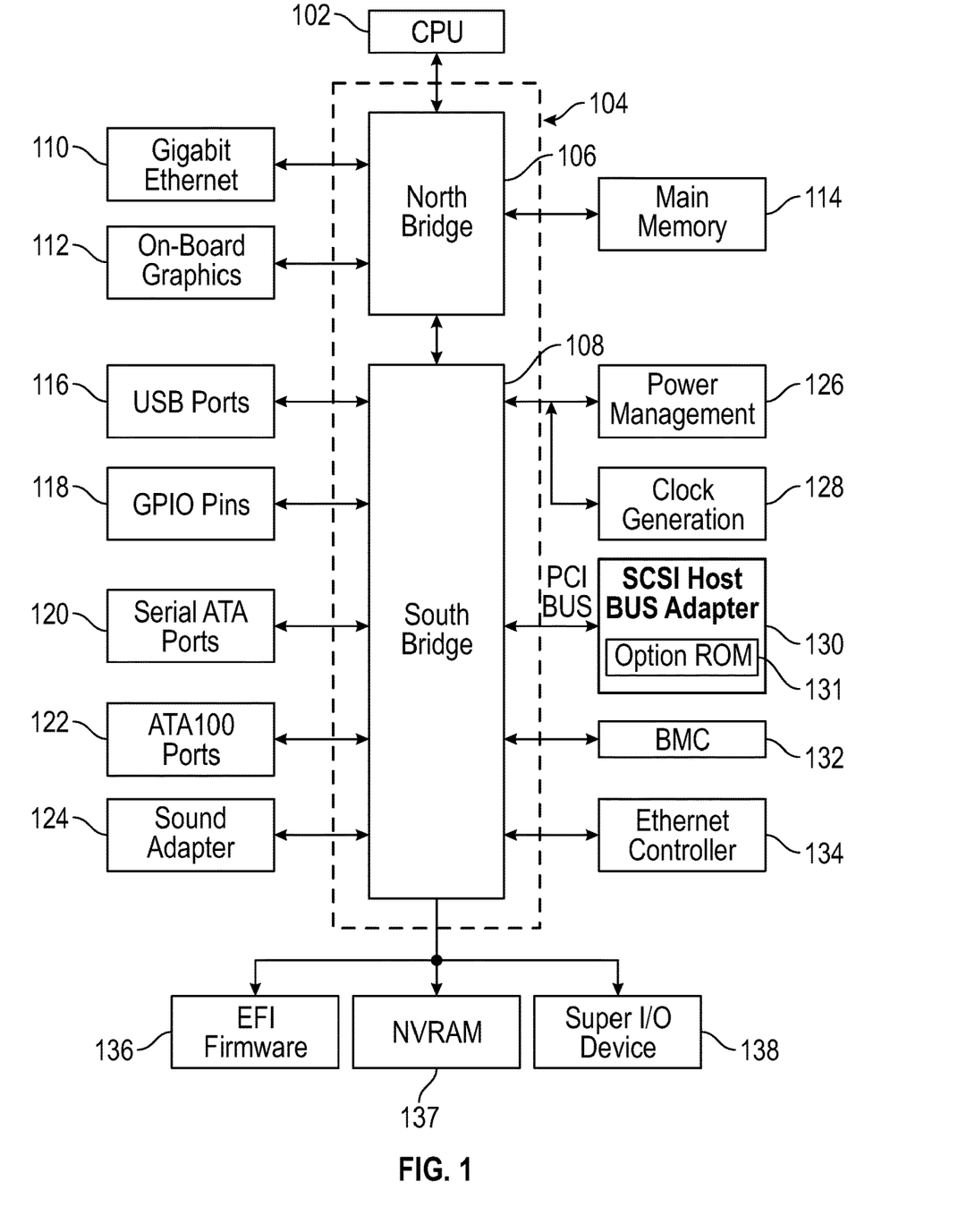
FIG. 1 is a block diagram of an example of an Information Handling System (IHS) configured to implement systems and methods according to some embodiments.

FIG. 1 shows an example of an IHS configured to implement systems and methods described herein. It should be appreciated that although certain embodiments described herein may be discussed in the context of a desktop or server computer, other embodiments may be utilized with virtually any type of IHS. In this example, the IHS is configured to manage SAS traffic with storage monitoring.

Particularly, the IHS includes a baseboard or motherboard 100, which is a printed circuit board (PCB) to which components or devices are mounted to by way of a bus or other electrical communication path. For example, Central Processing Unit (CPU) 102 operates in conjunction with a chipset 104. CPU 102 is a processor that performs arithmetic and logic necessary for the operation of the IHS.

Chipset 104 includes northbridge 106 and southbridge 108. Northbridge 106 provides an interface between CPU 102 and the remainder of the IHS. Northbridge 106 also provides an interface to a random access memory (RAM) used as main memory 114 in the IHS and, possibly, to on-board graphics adapter 112. Northbridge 106 may also be configured to provide networking operations through Ethernet adapter 110. Ethernet adapter 110 is capable of connecting the IHS to another IHS (e.g., a remotely located IHS) via a network. Connections which may be made by network adapter 110 may include local area network (LAN) or wide area network (WAN) connections. Northbridge 106 is also coupled to southbridge 108. In some embodiments, however, northbridge 106 may be part of CPU 102 (and the SCSI HBA described below may connect directly to the CPU).

Southbridge 108 is responsible for controlling many of the input/output (I/O) operations of the IHS. In particular, southbridge 108 may provide one or more universal serial bus (USB) ports 116, sound adapter 124, Ethernet controller 134, and one or more general purpose input/output (GPIO) pins 118. Southbridge 108 may also provide a bus for interfacing peripheral card devices such as BIOS boot system-compliant SCSI host bus adapter 130. In some embodiments, the bus may include a peripheral component interconnect (PCI) bus. Southbridge 108 may also provide baseboard management controller (BMC) 132 for use in managing the various components of the IHS. Power management circuitry 126 and clock generation circuitry 128 may also be utilized during operation of southbridge 108.

Additionally, southbridge 108 is configured to provide one or more interfaces for connecting mass storage devices to the IHS. For instance, in an embodiment, southbridge 108 may include a serial advanced technology attachment (SATA) adapter for providing one or more serial ATA ports 120 and/or an ATA100 adapter for providing one or more ATA100 ports 122. Serial ATA ports 120 and ATA100 ports 122 may be, in turn, connected to one or more mass storage devices storing an operating system (OS) and application programs.

An OS may comprise a set of programs that controls operations of the IHS and allocation of resources. An application program is software that runs on top of the OS and uses computer resources made available through the OS to perform application-specific tasks desired by the user.

Mass storage devices connected to southbridge 108 and SCSI host bus adapter 130, and their associated computer-readable media provide non-volatile storage for the IHS. Although the description of computer-readable media contained herein refers to a mass storage device, such as a hard disk or CD-ROM drive, it should be appreciated a person of ordinary skill in the art that computer-readable media can be any available media on any memory storage device that can be accessed by the IHS. Examples of memory storage devices include, but are not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices.

A low pin count (LPC) interface may also be provided by southbridge 108 for connecting Super I/O device 138. Super I/O device 138 is responsible for providing a number of I/O ports, including a keyboard port, a mouse port, a serial interface, a parallel port, and other types of input/output ports.

The LPC interface may connect a computer storage media such as a ROM or a flash memory such as a non-volatile random access memory (NVRAM) for storing BIOS/firmware 136 that includes BIOS program code containing the basic routines that help to start up the IHS and to transfer information between elements within the IHS. BIOS/firmware 136 comprises firmware compatible with the Extensible Firmware Interface (EFI) Specification and Framework.

The LPC interface may also be utilized to connect NVRAM 137 to the IHS. NVRAM 137 may be utilized by BIOS/firmware 136 to store configuration data for the IHS. In other embodiments, configuration data for the IHS may be stored on the same NVRAM 137 as BIOS/firmware 136.

BMC 132 may include non-volatile memory having program instructions stored thereon that enable remote management of the IHS. For example, BMC 132 may enable a user to discover, configure, and manage the IHS, setup configuration options, resolve and administer hardware or software problems, etc. Additionally or alternatively, BMC 132 may include one or more firmware volumes, each volume having one or more firmware files used by the BIOS' firmware interface to initialize and test components of the IHS.

As a non-limiting example of BMC 132, the integrated DELL Remote Access Controller (iDRAC) from DELL, INC. is embedded within DELL POWEREDGE servers and provides functionality that helps information technology (IT) administrators deploy, update, monitor, and maintain servers with no need for any additional software to be installed. The iDRAC works regardless of OS or hypervisor presence from a pre-OS or bare-metal state, because iDRAC is embedded within the IHS from the factory.

It should be appreciated that, in other embodiments, the IHS may comprise other types of computing devices, including hand-held computers, embedded computer systems, personal digital assistants, and other types of computing devices. It is also contemplated that the IHS may not include all of the components shown in FIG. 1, may include other components that are not explicitly shown in FIG. 1, or may utilize a different architecture.

In various embodiments, components of IHS of FIG. 1 may be used to implement aspects of a compute blade, a storage blade, a network blade, and/or a Chassis Management Module in a modular server system or chassis. As such, the IHS of FIG. 1 may be configured to implement various systems and methods for managing SAS traffic with storage monitoring according to some embodiments.

Figure 2:
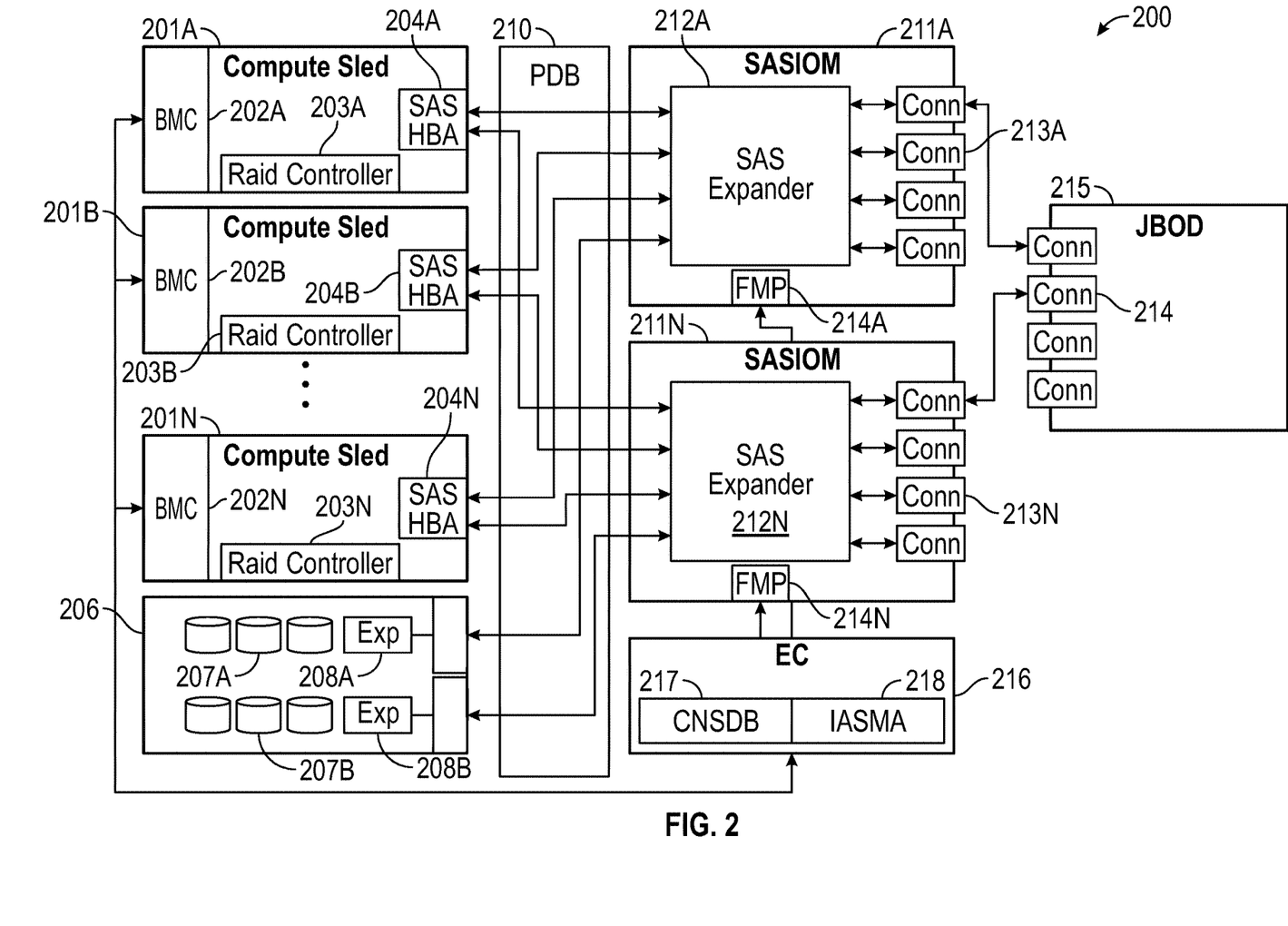
FIG. 2 is a block diagram of examples of aspects of a chassis having compute and storage blades configured to implement systems and methods according to some embodiments.

FIG. 2 is a block diagram of aspects of chassis 200 comprising one or more compute blades and storage blades configured to implement systems and methods described herein. As shown, compute blade 201A includes BMC 202A, redundant array of independent disks (RAID) controller 203A, and HBA 204A. A number of other compute sleds 201B-N may be present in chassis 200. Chassis 200 also includes storage sled 206, which comprises a plurality of storage devices or drives 207A-B (e.g., HDDs, SSDs, optical drives, etc.) and expander modules 208A-B.

Chassis 200 further comprises two or more SAS IOMs 211A-N. In this case, SAS IOM 211A includes SAS expander 212A, connectors 213A, and firmware management processor 214A; and SAS IOM 211N includes components similar to those of SAS IOM 211A. Each SAS IOM 211A-N may be coupled to external JBOD 215 via connectors 214.

In this implementation, compute blades 201A-N are each coupled to both SAS IOMs 211A-N via power distribution board (PDB) 210, which may include a PCB with electrical traces configured to route signals and messages exchanged among the various components of chassis 200. Although the aforementioned connections are provided via PDB 210 in this particular illustration, a person of ordinary skill in the art will immediately recognize in light of this disclosure that any other suitable connection device or apparatus may be used to connect these various components, such as cables, wires, midplanes, backplanes, connectors, multiplexers, routing circuitry, or the like.

EC 216 is coupled to FMPs 214A-N, and comprising Compute Node Storage Database (CNSDB) 217 and Intelligent Active Selection Module (IASM) 218. For example, EC 216 may be part of a chassis management module or the like. In various embodiments and in contrast with other systems, EC 216 may be in direct communication with compute blades 201A-N, independently of other conventional communications enabled by PDB 210.

Figure 3:
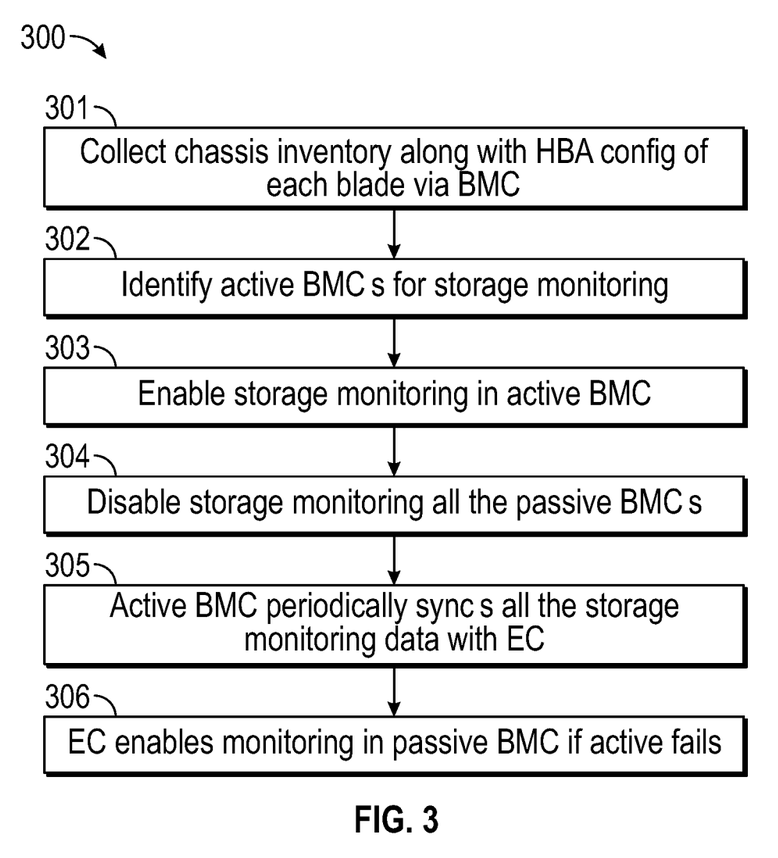
FIG. 3 is a flowchart of an example of a method for managing Serial Attached Small Computer System Interface (SAS) traffic with storage monitoring according to some embodiments.

In operation, EC 216 may employ CNSDB 217 and IASM 218 to implement various techniques for managing SAS traffic with storage monitoring. In that regard, FIG. 3 is a flowchart of an example of method 300 for managing SAS traffic with storage monitoring. In some embodiments, method 300 may be performed by IASM 218 of EC 216.

At block 301, method 300 includes collecting chassis inventory along with HBA configuration of each compute blade via their respective BMCs. The EC may store the collected compute blade parameters in non-volatile memory, and it may update CNSDB 217 along with blade serial number and corresponding HBA storage monitoring.

At block 302, method 300 includes identifying or designating each BMC as active or passive, with respect to storage monitoring. Then, at block 303, method 300 enables storage monitoring in an active BMC. At block 304, method 300 disables storage monitoring for all passive BMCs. At block 305, the active BMC periodically synchronizes all storage monitoring data with the EC. If the currently active BMC fails, method 300 enables monitoring by a previously designated passive BMC.

Again, at block 301, the EC may compare performance indicators of inventoried BMCs to identify a suitable active BMC. For example, the EC may compare the processing capabilities of BMCs (e.g., speed, operating frequency, model number, number of previous failures, date of manufacturing, version, etc.) in different compute sleds, and it may select one among the various BMCs that displays the most suitable processing capabilities (e.g., the fastest, most recently released, most reliable, etc.).

In some cases, upon designation by the EC, an active BMC may become responsible for performing all storage monitoring on behalf of all other BMCs, to the exclusion of those BMC,s which have been designated as passive. A passive BMC starts monitoring components of the storage sled only after being designated as active by the EC, for example, upon fault of the currently active BMC. As a result, the EC receives storage device monitoring data from the active BMC without receiving that monitoring data from the passive BMC. The EC may continue to designate a BMC as active using a round-robin method or the like.

Additionally or alternatively, method 300 may designate at least a second BMC as a "failover" BMC prior to failure of the currently active BMC. For example, the EC may be configured to periodically poll all passive BMCs for their respective health status and/or one or more of the aforementioned performance indicators. Additionally or alternatively, the EC may cause one or more of the passive BMCs to perform storage device monitoring at a lower rate (longer time intervals), and it may compare the readings obtained by those passive BMCs with the actual storage device monitoring being performed by the active BMC that is used by the EC to perform chassis management operations.

For example, if the active BMC polls all drives once every 10 seconds, the passive BMCs may poll all drives once every 1,000 seconds (that is, 10 times fewer commands than if the BMC were active), so as not to have a significant impact in overall SAS traffic while at the same collecting sufficient information to identify a best performing BMC to be designated as failover and/or active in case of a later fault of the active BMC.

In some cases, the failover BMC may be one among the of passive BMCs whose readings (e.g., temperature) are closest to those performed by the active BMC. The EC may designate one of the passive BMCs as a failover BMC and, upon detection of a storage monitoring failure or error, the failover BMC takes over all of the storage monitoring activity from the active BMC.

Additionally or alternatively, in various implementations, there may be sets of drives in the storage blade that are zoned across different compute blades, in which case the EC may independently select active and passive BMCs for each set of zoned drives. For example, storage devices of the storage sled may be grouped into tw disk zones, a first BMC may be configured to access a first zone comprising a first storage device and excluding a second storage device, a second BMC may be configured to access the second zone comprising a second storage device and excluding first storage device.

In some cases, the first BMC may be concurrently designated as active with respect to the first zone and as passive with respect to the second zone. The second BMC may be concurrently designated as active with respect to the second zone and as passive with respect to the first zone. Moreover, these different designations may be used simultaneously during normal operation of the chassis. As such, techniques described herein may be used with a single set of shared pool of drives and/or with multiple sets of shared pool of drives.

For sake of illustration, assume that a chassis has 3 compute blades and 2 zones of drives across 4 storage blades, such that zone 1 drives are shared across compute blades 1 through 3, and zone 2 drives are shared between compute blades 2 and 3. In this case, the EC may maintain a table or other data structure in CNSDB 217, such as Table I below:

TABLE I

| Zone 1 drive list | Active BMC 1, Passive BMC 2, Passive BMC 3 | Only BMC 1 does the monitoring, and BMCs 2 and 3 are designated by the EC to take over if BMC 1 goes down |
|---|---|---|
| Zone 2 drive list | Active BMC 2, Passive BMC 3 | Only BMC 2 does the monitoring, and BMC 3 is designated by the EC to take over if BMC 2 goes down |

The BMC designated as active may be a BMC that has the most number of drives assigned to its zone. Alternatively, the active BMC may be the BMC that has the fewest number of drives assigned to its zone.

Figure 4:
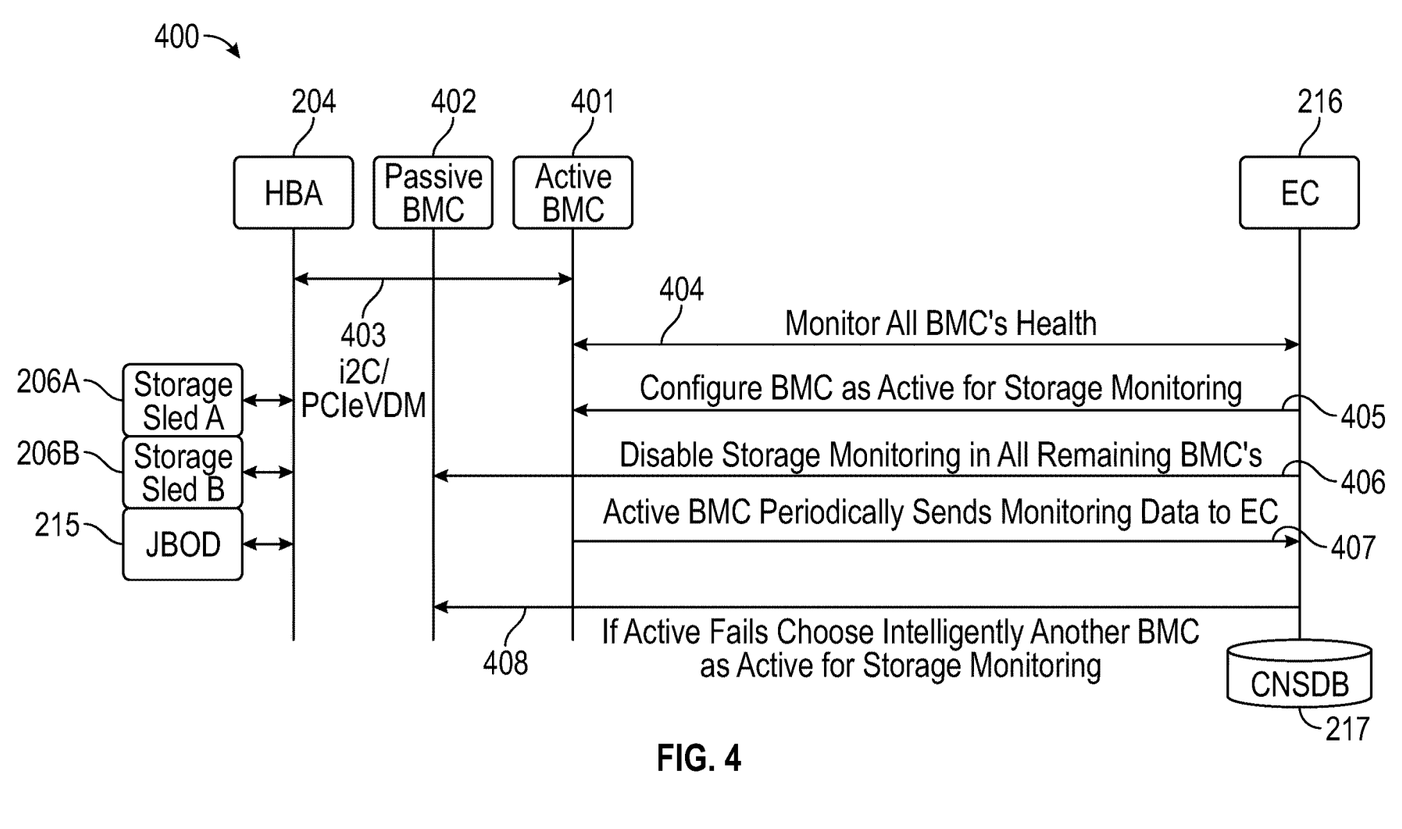
FIG. 4 show examples of messages exchanged in an implementation of a method for managing SAS traffic with storage monitoring according to some embodiments.

FIG. 4 show examples of messages exchanged in an implementation of method 300. In this case, messages 400 are exchanged among two or more of EC 216 having CNSDB 217, active BMC 401, passive BMC 402, HBA 204, storage sleds 206A-B, and JBOD 215. At the outset, message(s) 403 between HBA 204 and BMCs 402 and 403 establish an i2C/PCIe VDM channel with storage sleds 206A-B and JOBD 215. Then message(s) 404 are used to monitor BMC's health indicators. Examples of BMC health indicators include, but are not limited to: BMC uptime, BMC CPU utilization, BMC RealTime Monitoring Component status (healthy), and so on.

Message(s) 405 then are used to configure, enable, and/or designate BMC 401 as active for storage monitoring, and messages 406 are used to configure, disable, and/or designate BMC 402 to as passive.

Message(s) 407 are used by active BMC 401 to transmit monitoring data to EC 407. If or when active BMC fails or operates with degraded performance, message(s) 408 are used to configure, disable, and/or designate BMC 402 as active for storage monitoring. Information obtained via messages 400 are stored in CNSDB 217 to facilitate operation of method 300 in FIG. implemented using components of system 200.

As such, systems and methods described herein may be used to optimize SAS traffic in many different cluster architecture or appliances, and leverages storage Inventory/monitoring features which are scalable across different environments.

It should be understood that various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

The terms "tangible" and "non-transitory," when used herein, are intended to describe a computer-readable storage medium (or "memory") excluding propagating electromagnetic signals; but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise.

The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. An Information Handling System (IHS), comprising:
an embedded controller (EC); and
a memory coupled to the EC, the memory having program instructions stored thereon that, upon execution, cause the EC to:
designate a first Baseband Management Controller (BMC) of a first IHS coupled to a first plurality of storage devices as active;
designate a second BMC of a second IHS coupled to a second plurality of storage devices as passive, wherein the first and second BMCs are each configured to poll shared storage devices among the first and second pluralities of storage devices; and
receive, from the active BMC, monitoring data relating to the shared storage devices among the first and second pluralities of storage devices without receiving the monitoring data from the passive BMC.

2. The IHS of claim 1, wherein the first BMC is part of the first IHS and the second BMCs is part of the second IHS in a common chassis, and wherein the first and second pluralities of storage devices are part of a storage sled in the common chassis.

3. The IHS of claim 2, wherein each of the first and second IHSs is coupled to the storage sled via a respective host bus adapter (HBA) in communication with a Serial Attached Small Computer System Interface (SAS) expander.

4. The IHS of claim 1, wherein to designate the active BMC, the program instructions, upon execution, further cause the EC to select the first BMC over the second BMC for the active designation in response to a number storage devices in the first plurality of storage devices being: (i) larger or (ii) smaller than a number of storage devices in the second plurality of storage devices.

5. The IHS of claim 1, wherein to designate the active BMC, the program instructions, upon execution, further cause the EC to select the first BMC over the second BMC based upon a comparison between performance indicators of first and second BMCs.

6. The IHS of claim 1, wherein the first and second pluralities of storage devices are grouped into zones, wherein the first BMC is configured to access a first zone comprising a first storage device and excluding a second storage device, and wherein the second BMC is configured to access the second zone comprising a second storage device and excluding first storage device.

7. The IHS of claim 6, wherein the first BMC is concurrently designated as active with respect to the first zone and as passive with respect to the second zone, wherein the second BMC is concurrently designated as active with respect to the second zone and as passive with respect to the first zone, and wherein the designations are used simultaneously.

8. The IHS of claim 7, wherein the program instructions upon execution, further cause the EC to designate the second BMC as active upon failure or loss of performance of the first BMC.

9. The IHS of claim 1, wherein the program instructions upon execution, further cause the EC to:
designate a third BMC of a third IHS coupled to a third plurality of storage devices as passive;
receive, from the second and third BMCs, monitoring data relating to the shared storage devices in the first, second, and third pluralities of storage devices at a rate slower than the monitoring data received from the active BMC;
determine that the monitoring data received from the second BMC more closely matches the monitoring data received from the first BMC than the monitoring data received from the third BMC;
designate the second BMC as failover in response to the determination; and
designate the second BMC as active in response to failure or loss of performance of the first BMC.

10. An embedded controller (EC) having program instructions stored thereon that, upon execution by an Information Handling System (IHS), cause the IHS to:
designate a first Baseband Management Controller (BMC) of a first IHS coupled to a first plurality of storage devices as active;
designate a second BMC of a second IHS coupled to a second plurality of storage devices as passive, wherein the first and second BMCs are each configured to poll shared storage devices among the first and second pluralities of storage devices; and
receive, from the active BMC, monitoring data relating to the shared storage devices among the first and second pluralities of storage devices without receiving the monitoring data from the passive BMC.

11. The EC of claim 10, wherein the first BMC is part of the first IHS and the second BMC is part of the second IHS in a common chassis, wherein the first and second pluralities of storage devices are part of a storage sled in the common chassis, and wherein each of the first and second IHSs is coupled to the storage sled via a respective host bus adapter (HBA) in communication with a Serial Attached Small Computer System Interface (SAS) expander.

12. The EC of claim 10, wherein to designate the active BMC, the program instructions, upon execution, further cause the EC to select the first BMC over the second BMC based upon a comparison between performance indicators of first and second BMCs.

13. The EC of claim 10, wherein the first and second pluralities of storage devices are grouped into zones, wherein the first BMC is configured to access a first zone comprising a first storage device and excluding a second storage device, and wherein the second BMC is configured to access the second zone comprising a second storage device and excluding first storage device.

14. The EC of claim 13, wherein the first BMC is concurrently designated as active with respect to the first zone and as passive with respect to the second zone, wherein the second BMC is concurrently designated as active with respect to the second zone and as passive with respect to the first zone, and wherein the designations are used simultaneously.

15. The EC of claim 14, wherein the program instructions upon execution, further cause the EC to designate the second BMC as active upon failure or loss of performance of the first BMC.

16. The EC of claim 10, wherein the program instructions upon execution, further cause the EC to:
designate a third BMC of a third IHS coupled to a third plurality of storage devices as passive;
receive, from the second and third BMCs, monitoring data relating to the shared storage devices in the first, second, and third pluralities of storage devices at a rate slower than the monitoring data received from the active BMC;
determine that the monitoring data received from the second BMC more closely matches the monitoring data received from the first BMC than the monitoring data received from the third BMC;
designate the second BMC as failover in response to the determination; and
designate the second BMC as active in response to failure or loss of performance of the first BMC.

17. A method, comprising:
designating, by an embedded controller (EC) of an Information Handling System (IHS), a first Baseband Management Controller (BMC) of a first IHS coupled to a first plurality of storage devices as active;
designating, by the EC, a second BMC of a second IHS coupled to a second plurality of storage devices as passive, wherein the first and second BMCs are each configured to poll shared storage devices among the first and second pluralities of storage devices; and
receiving, at the EC from the active BMC, monitoring data relating to the shared storage devices among the first and second pluralities of storage devices without receiving the monitoring data from the passive BMC.

18. The method of claim 17, wherein the first BMC is part of the first IHS and the second BMC is part of the second IHS in a common chassis, wherein the first and second pluralities of storage devices are part of a storage sled in the common chassis, and wherein each of the first and second IHSs is coupled to the storage sled via a respective host bus adapter (HBA) in communication with a Serial Attached Small Computer System Interface (SAS) expander.

19. The method of claim 17, wherein storage devices of the storage sled are grouped into zones, wherein the first BMC is configured to access a first zone comprising a first storage device and excluding a second storage device, and wherein the second BMC is configured to access the second zone comprising a second storage device and excluding first storage device.

20. The method of claim 19, wherein the first BMC is concurrently designated as active with respect to the first zone and as passive with respect to the second zone, wherein the second BMC is concurrently designated as active with respect to the second zone and as passive with respect to the first zone, and wherein the designations are used simultaneously.

* * * * *